United States Patent [19]

Ives

[11] 4,239,580
[45] Dec. 16, 1980

[54] IMPREGNATED FABRIC APPLICATOR WITH VIBRATING APPLICATOR ROLLS

[76] Inventor: Frank E. Ives, 2402 M St. N.E., Auburn, Wash. 98002

[21] Appl. No.: 929,779

[22] Filed: Jul. 31, 1978

[51] Int. Cl.³ .................... B29C 27/22; B21B 13/02
[52] U.S. Cl. .................... 156/468; 156/486; 156/575; 156/73.6; 425/110; 425/460; 29/116 R; 29/121.5
[58] Field of Search ............. 156/468, 486, 575, 576, 156/577, 73.6, 574; 29/125, 116 R, 121.1, 121.5, 126; 425/90, 110, 374, 460

[56] References Cited

U.S. PATENT DOCUMENTS

| 3,131,104 | 4/1964 | Korn | 156/73.6 |
| 3,681,484 | 8/1972 | McKie et al. | 425/456 X |
| 3,752,728 | 8/1973 | Smirnov et al. | 156/577 |

FOREIGN PATENT DOCUMENTS

| 345143 | 1/1931 | United Kingdom | 29/125 |
| 156671 | of 1963 | U.S.S.R. | 156/577 |

Primary Examiner—John T. Goolkasian
Assistant Examiner—Lois E. Rodgers
Attorney, Agent, or Firm—Christensen, O'Connor, Johnson & Kindness

[57] ABSTRACT

Disclosed is an apparatus for applying polyester resin impregnated fabric onto a smooth surface. Fabric is impregnated with polyester resin and pressed onto a flat or curved surface by means of vibrating rolls which may be remotely controlled to conform with the contours of the surface. Vibration of the rolls removes entrained air bubbles and permits complete application of the impregnated fabric in a single pass of the apparatus. The fabric is dispensed, impregnated and applied from a frame which is suspended from an overhead gantry and which may be moved in three dimensions. On the frame are mounted a roll of fabric, an impregnator for impregnating the fabric with resin, and a series of pneumatically vibrated rollers for applying the impregnated fabric. Operation is controlled from a console attached to the frame.

12 Claims, 6 Drawing Figures

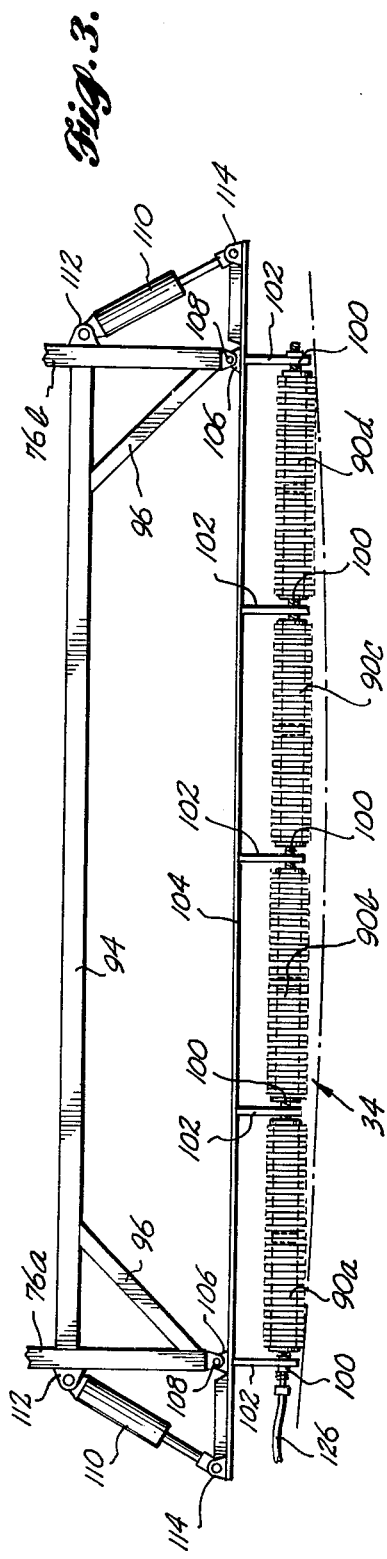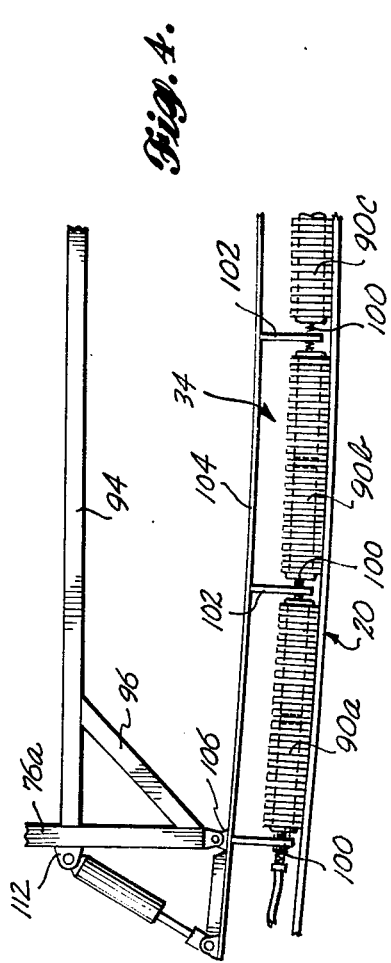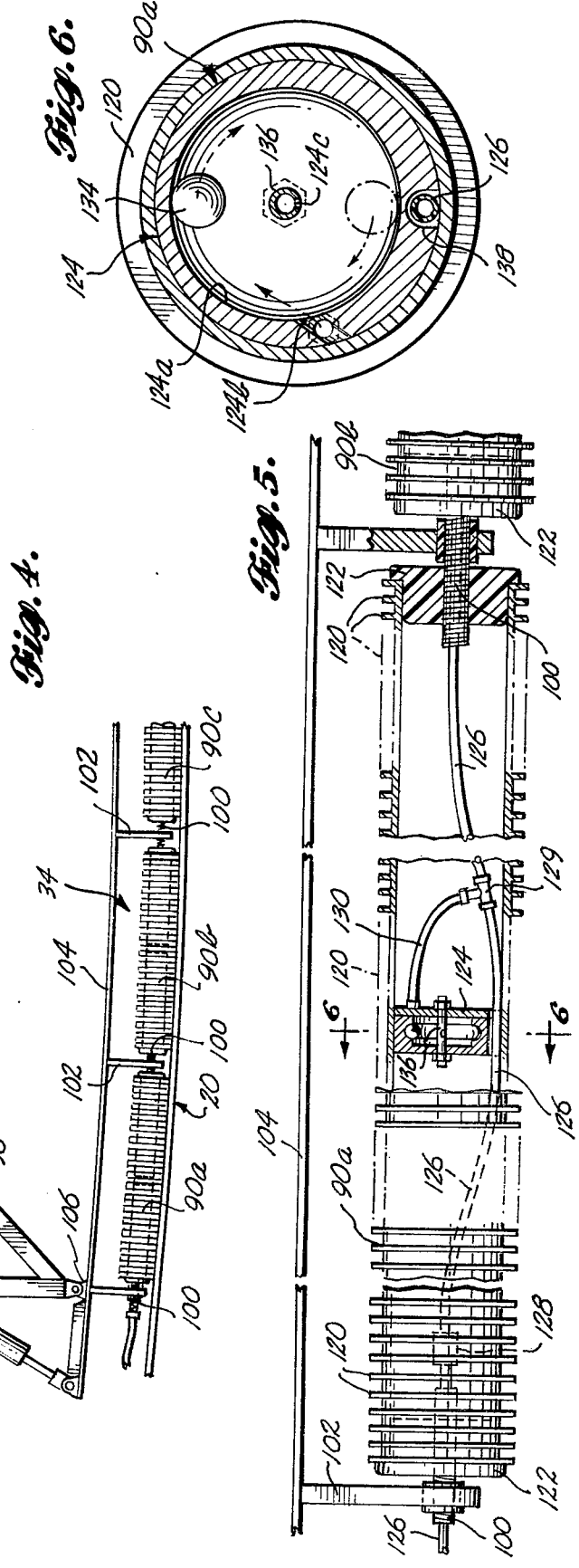

IMPREGNATED FABRIC APPLICATOR WITH VIBRATING APPLICATOR ROLLS

BACKGROUND OF THE INVENTION

This invention is related to devices for applying liquid saturated fabric to a surface, and, more particularly, to devices for impregnating glass fabric with polyester resin and applying it to a mold surface.

The present invention was developed for use in handling glass fabric and polyester resin during the construction of glass boat hulls, containers, and other objects generally requiring construction of large glass panels. The handling of the large quantities of glass fabric and polyester resin required to construct such panels gives rise to certain problems to which the present invention is addressed.

The formation of a glass reinforced panel on a mold surface involves essentially three steps. First, a catalyst must be added to a liquid polyester resin. This step typically consists of mixing a small amount of liquid catalyst with a relatively large amount of liquid polyester resin. The relative proportions of catalyst and resin must be precisely controlled and the mixing must be rapid and thorough to ensure uniform and predictable hardening of the resin. Once the resin has been catalyzed, the hardening process begins and there is a limited amount of time during which the catalyzed resin remains sufficiently fluid to permit impregnation of the glass fabric and subsequent application of the saturated fabric onto a mold surface. Because of the limited amount of time available for handling and working the glass fabric after the resin has been catalyzed, mixing of the catalyst and resin is typically done immediately prior to the impregnation of the fabric with the catalyzed resin.

The second step in the formation of a glass reinforced panel involves impregnation of the glass fabric with the catalyzed resin. This process must be precisely controlled so as to ensure complete saturation and wetting of the fabric with the resin, yet avoiding the use of too much resin. The strength weight and other properties of the final glass product are dependent on the relative amounts of glass fabric and polyester resin comprising the product. Generally, optimum characteristics of the final product are achieved when the amount of polyester resin employed is the minimum amount necessary to thoroughly impregnate and wet the glass fabric. The use of too little resin may result in improper wetting and bonding of the glass fabric, with resultant decrease in tensile strength of the final product. On the other hand, the use of too much resin results in the addition of weight, but little additional strength, to the final product. Thus, in practice it is necessary to continuously monitor and control the amount of polyester resin with which the glass fabric is impregnated.

The final step in the process is the application of the impregnated glass fabric onto a mold surface. The mold surface is typically smooth and coated with a releasing agent, for example wax, that permits the final product to be removed without sticking. If the final glass product is to consist of multiple layers of glass fabric, such layers must be successively applied such that they become thoroughly bonded to one another. Where a successive layer is to be applied onto a previously applied layer, this is normally accomplished by applying the successive layer while the previously applied layer is still tacky, that is, before the previously applied layer has hardened.

Where large surfaces are being covered, or where vertical surfaces must be covered, it is usually necessary to assemble scaffolding to accommodate workers who manually work the impregnated fabric onto the surface. This is cumbersome and time consuming because the scaffolding must be assembled and disassembled as the application progresses.

Whether a layer of impregnated glass fabric is applied directly onto a fresh mold surface or onto a previously applied layer, it is necessary that the impregnated fabric be applied smoothly and free of entrained air bubbles. In the application of impregnated glass fabric under the prior art, removal of entrained air bubbles and consolidation of the fabric onto the mold are often the rate limiting steps in the overall application process. Removal of air bubbles is normally accomplished manually, various tools being available for this task. Quality control of this process is difficult to achieve due to the difficulty of inspecting and monitoring the application process during actual operation.

Accordingly, it is an object and purpose of this invention to provide an apparatus which removes entrained air bubbles as it applies an impregnated glass fabric to a surface.

It is a further object of this invention to provide an apparatus which applies impregnated glass fabric free of air bubbles to a surface in a uniform and consistent manner, thereby improving upon the quality of the final product over that which may be had when air bubbles are manually removed.

It is a further object of this invention to provide an apparatus which applies impregnated glass fabric and removes entrained air bubbles simultaneously and in a single pass of the applicator, thereby increasing the overall rate at which a glass reinforced product can be produced.

It is a further object of the present invention to provide an apparatus that can not only apply an impregnated glass fabric to a surface and remove entrapped air bubbles but, as importantly, that can also consolidate the glass fabric so applied onto the mold surface or with a previously applied layer of fabric without manual sweeping or similar additional manipulation of the fabric, thereby eliminating the need for manual consolidation labor, eliminating the need for scaffolding that must otherwise be employed within the mold to support the personnel required for manual consolidation of the fabric, and thus significantly decreasing the time required to apply and consolidate the impregnated fabric.

Finally, it is an object of this invention to provide an apparatus whereby a single individual operating from a control console can direct the entire process from mixing and impregnation of the resin to final application and consolidation of the impregnated glass fabric onto a surface.

SUMMARY OF THE INVENTION

In its broadest aspects, the present invention fulfills the foregoing objects, and other objects that will become apparent to one of ordinary skill in the art after reading the following specification, by providing a roll having a plurality of circumferential fins thereon and means associated with the roll for vibrating the roll in a direction transverse to the axis of the roll. The vibrating roll applies a strip of impregnated fabric to a surface as the roll is moved across the surface, works the fabric to remove entrapped air, and consolidates the fabric with the surface.

More particularly, the vibrating roll is preferably mounted on a flexible axle in turn mounted on a support frame along with a plurality of additional coaxially aligned vibrating rolls. The support frame can in turn be mounted on apparatus for supplying resin impregnated fabric to the vibrating rolls. The apparatus in turn is supported by means for moving the apparatus in two dimensions horizontally, and in the vertical direction, and for rotating the apparatus about a vertical axis. Thus the rolls are provided with four degrees of freedom of movement so that fabric can be applied to and consolidated on molds of a variety of shapes.

In accordance with a preferred aspect of the present invention a frame is suspended from an overhead gantry. On the frame is an operator console, a fabric impregnator and an applicator. From the operator console, an individual can control the motion and position of the frame and operate the impregnator and applicator. An overhead gantry system permits movement in two directions on a horizontal plane. A vertically movable positioning mechanism allows the operator to move the frame up and down. A turntable mechanism allows the frame to be rotated about a vertical axis. Thus, the position of the frame is controllable in three dimensions while the impregnated fabric can be applied to surfaces of various angles because of the rotational capability.

Glass fabric is stored as and dispensed from rolls of fabric mounted on the frame. The rolls of glass fabric are typically 18 inches to 50 inches in width. During operation, glass fabric is dispensed from the rollers and run through squeeze rollers where the glass material is impregnated with catalyzed resin. The liquid catalyst and resin are pumped through flexable tubes from external sources, to an automatic gunhead where mixing takes place. The catalyzed resin is then dispensed from horizontal pour tubes onto a trough formed between the squeeze rollers. The ends of the squeeze rolls are dammed to create a resin reservoir around the fiberglass fabric as it passes through the squeeze rollers. As the fabric passes between the rollers, a controlled amount of resin is impregnated into the fabric.

Upon emerging from the squeeze rolls, the impregnated fabric passes to an applicator which impresses it onto the walls of the mold surface by means of a plurality of vibrating rolls. The vibrating rolls are coaxially aligned and mounted on flexible spring axles which allow them to vibrate in a circular motion about their longitudinal axes. Circular vibration is induced in each roll by a pneumatically driven ball which is constrained to rapidly roll around the inside surface of a race located at the center of the roll. A pneumatic hose passing through the length of each roll channels high pressure air from a suitable air supply to each ball race. In each race, the high pressure air is injected at a small angle relative to a tangent to the surface of the race, thereby driving the ball rapidly in a circle around the race. To permit the pneumatic hose to pass around the race at the center of each roll, each race is eccentrically positioned so that the pneumatic hose can pass through the casting forming the race. To connect the air supply of the several rolls, the pneumatic hoses pass from the interior of the rolls through the flexible spring axles and are connected to the air supply.

A flexing mechanism permits adjustment of the normal axial alignment of the vibrating rolls to conform with curves in the mold surface. This mechanism is particularly useful in connection with large, slightly curved mold surfaces, such as that of a boat hull. The flexing mechanism functions by bending a spring steel shank on which the vibrating rolls are mounted. The shank is fixed by pivot mounts at two points and is connected to hydraulic cylinders at its ends. In its unflexed state, the spring steel shank is straight and the vibrating rolls are coaxially aligned. In this position, impregnated glass may be applied to flat surfaces. To apply impregnated glass to a gently curved concave surface, such as a boat hull, the hydraulic cylinders retract the ends of the shank, thus bowing out the center of the shank until the surfaces of the vibrating rolls generally conform with the surface of the mold.

The vibrating rolls and the flexing mechanisms are mounted on an arm assembly which is swingably attached to the bottom center of the frame. A drive unit swings the arm assembly into position so that the rolls face the mold surface.

In practice, it is found that the vibration of the rolls removes essentially all entrained air bubbles in the single pass necessary to lay down impregnated glass fabric. By contrast, using prior art methods and apparatus, as many as six passes of a nonvibrating roll were needed to remove air bubbles. The vibrating rolls of the present invention also eliminate the need for extensive manual working of the applied fabric to consolidate the fabric onto the mold surface of a previously applied layer of fabric. Also eliminated by the invention, therefore, is the need for extensive scaffolding or other cumbersome structures required to accommodate workers for removing the bubbles and wrinkles. Thus the present invention is capable of applying fabric, removing air bubbles and wrinkles from the fabric, and consolidating the fabric with the surface to which it is applied in a single, relatively quick pass over the surface.

BRIEF DESCRIPTION OF THE DRAWINGS

FIG. 3 is a plan view of the applicator head of the present invention in an unflexed position;

FIG. 4 is a plan view of the applicator head in a flexed position;

FIG. 5 is a longitudinal sectional view of a vibrating, applicator roll constructed in accordance with the present invention; and FIG. 6 is a cross sectional view at the center of an applicator roll showing the ball race and ball for vibrating the roll.

DESCRIPTION OF THE PREFERRED EMBODIMENT

Figure 1:
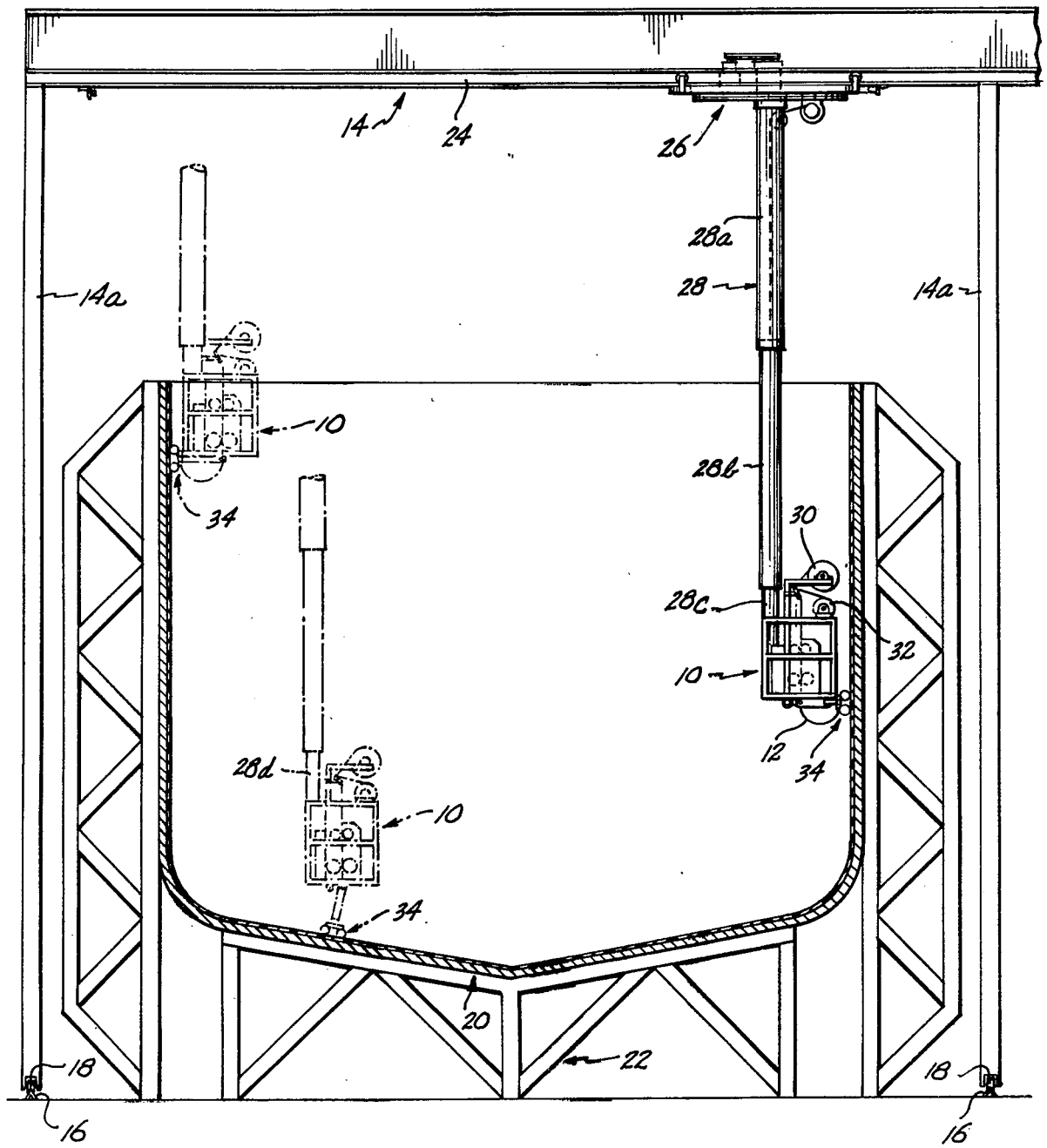
FIG. 1 is an elevation view in partial cross section of the apparatus of the present invention in operation during the construction of a boat hull.
Figure 2:
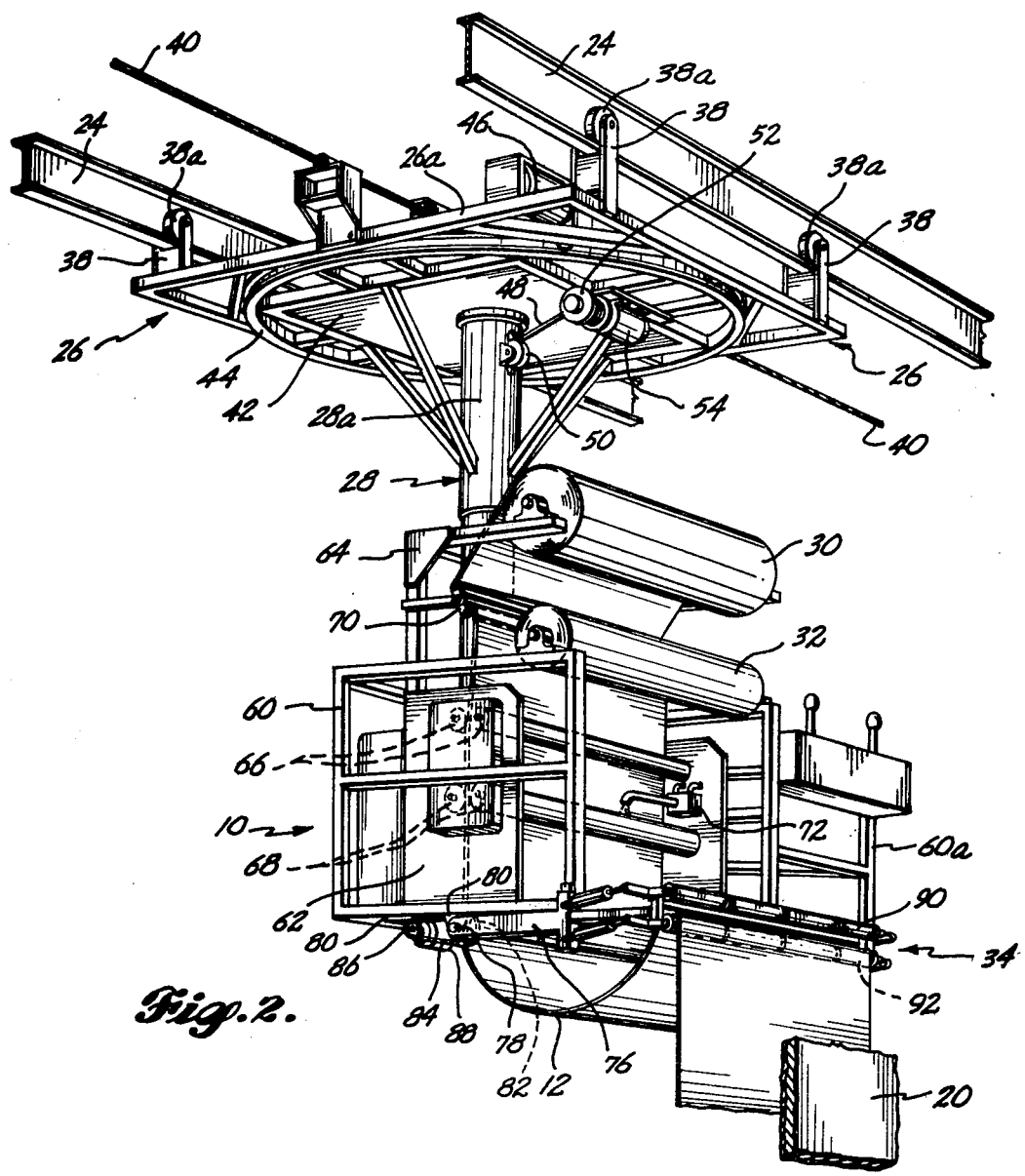
FIG. 2 is a perspective view of the complete apparatus of the present invention and a portion of its overhead gantry.

Referring first to FIG. 1, the applicator 10 for applying a sheet of liquid impregnated fabric 12 to a surface is mounted on an overhead gantry, generally designated 14. The gantry is mounted on parallel rails or tracks 16 which are spaced on each side of the mold 20 to which the fabric 12 is being applied. The gantry frame 14a is carried along the tracks 16 on wheels rotatably mounted on the gantry frame. As will be understood by one of ordinary skill in the art, additional vertical frame members reside behind those shown in FIG. 1 to support parallel overhead rails or tracks 24. Referring to FIG. 2, the overhead rails 24 are spaced to receive travelling carriage 26. Carriage 26 can be moved longitudinally and laterally relative to the mold 20 via movement along rails 16 and 24, respectively. The applicator 10 is suspended from the carriage 26 via a telescoping lift assembly 28. As will be described in additional detail below, the telescoping assembly 28 can be extended and retracted to lower and raise the applicator 10 relative to the mold 20. Thus the applicator 10 is mounted by the gantry 14 and the lift assembly 28 for movement in three directions relative to the mold 20 to appropriately position the applicator 10 relative to the mold 20 for laying the fabric 12 on all parts of the mold. Additionally, as will be explained in more detail below, the lift assembly 28 is coupled to a turntable on the carriage 26 that allows the applicator 10 to be rotated about the vertical axis of the telescoping lift.

Referring back to FIG. 1, the present invention will be described further in relation to the application of a fabric of glass fibers impregnated with, for example, a polyester resin. The term "fabric" as used herein is intended to encompass woven and nonwoven fabrics and mats. It is to be understood that the apparatus of the present invention can be utilized to apply fabrics composed of materials different from glass, whether or not those fabrics are impregnated with a liquid such as a polyester resin. For purposes of the present specification, the mold 20 is in the shape of a boat hull. The beam of the boat mold is illustrated in cross section in FIG. 1, while the length or longitudinal dimension of the hull is orthogonal to the plane of FIG. 1. The present invention can also be advantageously used with other mold shapes.

Still referring to FIG. 1, the applicator 10 feeds fabric from rolls 30 and 32 through a resin impregnator (to be described in more detail below) and thereafter feeds the fabric to a vibrating roll assembly 34, comprising matched sets of vibrating rolls. To initiate the application of a strip of fabric across the mold 20, the applicator 10 is positioned, for example, at the upper right hand end of the mold 20 and is moved downwardly along the side of the mold 20, applying the fabric to the right hand side of the mold as it proceeds downwardly. The vibrating roll assembly 34 is pivotally mounted on the applicator 10 so that as the applicator reaches the lower right hand corner of the mold, the roll assembly 34 can be swung downwardly through an arc so that the roll assembly is contacting the bottom of the mold as the applicator is traversed from right to left along the bottom of the mold via the travelling carriage 26. Fabric is thus laid on the mold bottom, as shown in phantom outline, as the applicator crosses the bottom of the mold 20. Likewise, the roll assembly 34 can be swung to the opposite side of the applicator 10 so that as the applicator reaches the left side of the mold and is moved upwardly via the telescoping lift 28, the roll assembly can contact the interior of the mold and continuously lay fabric along the left hand side of the mold. After a strip of fabric is laid from the upper right hand corner of the mold 20 downwardly across the bottom of the mold and upwardly to the upper left hand corner of the mold, the entire gantry 14 is moved longitudinally relative to the mold so that another strip of fabric can be applied to the mold adjacent the previously applied strip. The applicator can of course be employed to apply a first layer of fabric to the mold and thereafter be employed to apply successive layers of fabric to build up a laminated structure.

Referring to FIG. 2, the carriage 26 is suspended from the tracks 24 by wheel assemblies 38, which are affixed to and extend upwardly from the rectangular carriage frame 26a. The bottom flanges of the I-beam tracks 24 receive wheels 38a in rolling relationship. The carriage 26 is moved along the tracks 24 via a drive cable 40 securely attached to the top of the carriage. The drive cable 40 extends in both directions from the carriage parallel to the rails 24. A cable drive assembly (not shown) mounted atop the gantry receives the ends of the cable 40. By selectively actuating the cable drive assembly, the carriage 26 can be moved longitudinally along the rails 24, that is, transversely relative to the mold 20.

The telescoping lift assembly 28 is suspended from a turntable platform 42 which in turn is mounted on a circular rail 44. The circular rail 44 is suspended from suitable wheels 42a attached to the rectangular frame 26a of the carriage. The platform 42 can be rotated through 360° by energization of a turntable motor 46, which drives a pinion in turn meshing with a ring gear (not shown) affixed to the circular rail 44. The telescoping lift assembly 28 comprises a plurality of telescoping tubular sections 28a, 28b, 28c and 28d (FIG. 1). A cable 48 is strung through the interior of the tubular sections. The bottom end of the cable is attached to the bottommost tubular section 28d. The upper portion of the cable 48 is strung over a sheave 50 mounted on the uppermost portion of the upper tubular section 28a and is thereafter wrapped about a winch drum 52. The winch drum 52 is connected to a suitable prime mover 54, such as a reversible electric motor with an integral brake assembly. By selectively actuating the electric motor and thus paying out cable from the winch drum 52, the telescoping sections are successively extended to lower the entire applicator 10. By taking up cable on the winch drum 52, the telescoping sections are retracted to lift the applicator 10 toward the carriage.

A control station 60a is attached to the basic frame 60 of the applicator assembly 10 to hold an operator. Operating controls are housed within the control station 60a for energizing and selectively controlling the movement of the gantry 14, the movement of the carriage 26, the rotational movement of the platform 42, and the movement of the telescoping lift 28. Since the basic control circuitry for controlling movement of the applicator assembly is well within the capabilities of one of ordinary skill in the art, the control and power circuitry will not be further described herein. Thus by manipulation of the appropriate controls at the control station 60a, the applicator assembly 10 can be lowered or raised relative to the mold 20 by extension and retraction of the telescoping lift assembly 28, can be rotated about the vertical axis of the telescoping lift assembly by rotation of the platform 42 to properly orient the applicator toward curved mold sections, and can also be moved longitudinally and transversely relative to the mold via movement of the carriage 26 along the rails 24 and by movement of the entire gantry 14 along the rails 16.

The frame 60 of the applicator assembly 10 carries a resin supply tank 62 and roll support frame 64, as well as fabric feed rolls 66 and resin impregnator rollers 68. A first roll 30 of fabric is mounted for rotation on the roll support frame 64 via a support shaft journaled in suitable bearings, while a second roll 32 of fabric is mounted on the main frame 60 via suitable bearings.

The fabric from each of the rolls 30 and 32 prior to impregnation is strung over a tensioning guide 70 mounted above the feed rolls 66. The fabric then passes through the feed rolls 66, which pull the fabric from the rolls 30 and 32 and forward the fabric to the impregnating or squeeze rollers 68. Resin is drawn from the resin supply tank 62 and pumped by a suitable resin pump (not shown) to a mixing gun 72 where it is mixed with a resin catalyst from a catalyst tank (not shown). The catalyzed resin is then pumped into the trough formed between the two impregnating rollers 68. The ends of the rolls are dammed so that the resin level can build up in the trough. As the fabric passes between the rollers 68, it is impregnated with the proper amount of resin. The controls for the fabric impregnation assembly, such as the feed roll speed control and the resin flow controls, are also housed within the control station 60a. The basic portion of the applicator assembly just described, including the basic frame 60, the fabric roll support frame 64, the resin supply tank 62, the feed rolls 66, and impregnating rollers 68, as well as the mixing gun 72, are all commercially available from Venus Products, Inc., of Kent, Wash., and therefore will not be described in greater detail here.

After the fabric 12 is impregnated with resin by the impregnating rollers 68, it extends through the bottom of the frame 60 and is draped outwardly toward the end of the applicator roll assembly 34. The subframe 76 of the roll assembly 34 comprises two parallel arms 76a and 76b (FIG. 3), the inner ends of which are fixed to a shaft 78. The shaft 78 is in turn pivotally mounted on flanges 80 extending downwardly from the bottom of the frame 60 of the applicator 10. A gear 82 is affixed to the shaft 78. A chain 84 engages the gear 82 and a second gear 86, in turn coupled to a suitable prime mover, such as a reversible electric motor 88, with an integral brake that prevents rotation of the motor shaft when the motor is deenergized. By reversibly energizing the electric motor 88, the subframe 76 can be swung through 180° relative to the bottom of the frame 60 to swing the roll assembly 34 through an arc so that fabric may be applied continuously and successively to the one side, bottom and opposite side of a mold. Two sets 90 and 92 of applicator rolls are mounted on the outer end of subframe 76 in a manner that will be described in more detail below. The impregnated fabric 12 is fed between the two sets 90 and 92 of rolls. As shown, the fabric 12 is draped over the bottom set 92 of rolls. When the applicator assembly 10 is moving in an upward direction, the lead set 90 of rolls first contacts the surface, such as mold 20 or a previously applied layer of fabric, to which the fabric is being applied. The bottom set of rolls lays the fabric onto the mold surface. The two sets of rolls are constantly vibrated in a direction transverse to the roll axes as the fabric is laid. The vibrating action of the lead set 90 of rolls works the fabric layer previously applied to cause bubbles of air trapped between the resin impregnated fabric and the mold to the surface of the previously applied layer. As the new strip of fabric 12 is laid against the mold, or a previously applied layer of fabric, the vibrating action of the bottom set 92 of rolls will work the newly laid fabric to drive most if not all of the air entrapped below the newly laid fabric to its exterior surface. Thus the action of the vibrating rolls and of the continuous movement of the rolls along the mold surface combines to remove trapped air from beneath the impregnated fabric, eliminating any voids in the structure being molded that would otherwise have to be worked out by manual labor.

It is to be understood that the role of the sets 90 and 92 of rolls can be reversed when, for example, the applicator assembly is moving downwardly relative to the mold. In the latter instance, the fabric 12 is fed under the top set 90 of rolls. Thus the bottom set 92 of rolls would function as the lead rolls and the top set would function as the following rolls to work the entrapped air to the surface of the newly applied layer of fabric.

Referring now to FIG. 3, the parallel arms 76a and 76b of the applicator roll subframe are joined by a reinforcing frame cross member 94. Reinforcing beams 96 are joined adjacent the outer ends of the arms 76a and 76b and angle inwardly toward and are affixed to the cross member 94 to form a reinforcing truss section. In this view, only the upper set 90 of rolls can be seen. The bottom set 92 of rolls is constructed and mounted identically to the upper set 90 and therefore only the upper set will be described. In the presently preferred embodiment, four rolls 90a, 90b, 90c and 90d are coaxially aligned along an axis that is substantially parallel to the pivot axis defined by subframe mounting shaft 78. The rolls 90a through 90d are joined by and rotate about flexible axles 100. The flexible axles 100 are in turn mounted on mounting arms 102 extending orthogonally from the axles. The inner ends of the mounting arms 102 are affixed to a spring steel roller mounting bar or shank 104. The spring steel mounting bar 104 carries flanges 106 spaced the same distance apart as the ends of the subframe arms 76a and 76b. Each of the flanges 106 are pivotally mounted by pins 108 to the outer ends of the arms 76a and 76b. The pivot pins enter slots (not shown) in the flanges 106 to allow a small amount of longitudinal movement in the mounting bar 104 relative to the arms 76a and 76b. First ends of two fluid powered piston and cylinder assemblies 110 are respectively attached by suitable pivotal mounts 112 to the frame arms 76a and 76b at locations spaced inwardly from the ends of the frame arms. The opposite ends of the fluid powered piston and cylinder assemblies are pivotally mounted by suitable mounts 114 to the ends of the spring steel mounting bar 104 that protrude beyond the sides of the frame arms 76a and 76b. The piston and cylinder assemblies are retractible and extendable by application of a suitable pressurized fluid, such as air from a source (not shown) of the same. As the piston and cylinder assemblies 110 are retracted, the ends of the mounting bar 104 are drawn toward the frame arms 76a and 76b, thus bowing or bending the center portion of the spring steel mounting bar 104 outwardly relative to the subframe 76. As the bar 104 is bowed, the serially arranged rolls 90a through 90d are displaced from their coaxial relationship into an arcuate path as shown in FIG. 4. In this manner, the set 90 of rolls can be made to conform to an arcuate surface to which fabric is to be applied. Conversely, the piston and cylinder assemblies can be extended to cause the center portion of the mounting bar 104 to bow inwardly so that the sets of rolls can conform to a reverse curve in the mold to which fabric is being applied.

Referring now to FIG. 5, an enlarged view of a roll 90a is illustrated. The preferred roll is tubular and carries a plurality of equally spaced, circumferential, radially outwardly extending fins 120. A hub insert 122 is fitted into each end of the roll 90a. A coaxial bore in the hub 122 carries the coil spring axles 100. The hubs 122 are preferably made of a polymeric material having a low coefficient of friction so that the hubs can rotate freely about the axles 100. A vibrator assembly 124 is mounted in the hollow roll 90a preferably at about the center of the axial dimension of each roll. The vibrator assembly 124 will be described in additional detail in conjunction with FIG. 6. Still referring to FIG. 5, the vibrator assembly 124 is pneumatically powered and thus must be supplied with a source of pressurized fluid such as air. Air is supplied to the vibrator assembly 124 via fluid conduits 126. The fluid conduits 126 extend through the end one of the axles 100 and into the interior of the roll 90a. A rotating fluid coupling 128 is interposed in the fluid conduit 126 so that the internal portions of the conduit can rotate relative to the stationary portion of the conduit 126 extending through the axle and outside the roll. Conduit 126 extends from the fluid coupling 128 through an aperture 138 in the housing for the vibrator assembly 124. A T-coupling 128 is interposed in the conduit 126. From the T-coupling 128, the conduit 126 extends through the next adjacent axle 100 into the next adjacent roll to supply air to a similar vibrator assembly mounted in that roll. A stub conduit 130 extends from the T-coupling 128 to a fitting on the vibrator assembly 124 to supply pneumatic fluid to the vibrator assembly.

As illustrated in FIG. 6, the vibrator assembly 124 is machined to provide an outer housing outline that is circular in cross section. Preferably, the diameter of the housing is chosen so that the vibrator assembly can be press fitted into the interior of the roll 90a. The vibrator assembly 124 contains an internal circular raceway, generally designated 124a. The raceway 124a is positioned slightly eccentrically within the raceway housing 124a and thus within the roll bore. The eccentric offset is provided to allow sufficient housing thickness to accommodate the supply conduit aperture 138. The raceway 124a carries a relatively massive ball 134 which when driven around the raceway will maintain contact with the raceway via centrifugal force. The ball 134 is driven in its circular path about the raceway by a jet of pneumatic fluid which enters the raceway cavity via port 124b, which is supplied with fluid from the conduit 130. The port can be arranged tangentially to the raceway or at a small angle relative to a tangent to the raceway or, preferably, can be arranged as shown along an imaginary chord of the circular raceway. Air is exhausted from the raceway cavity via a central exhaust port 124c. As shown in FIG. 5, the raceway is formed in two segments and held together via a tubular bolt 136. The port 124c communicates with the bore within the tubular bolt 136. Air enters the port 124c, travels through the bolt bore and is exhausted through the end of the bolt.

The vibrator assembly employed with the present invention can be made from a commercially available vibrator sold under the trademark "VIBRA-BALL", available from the Cleveland Vibrator Company of Cleveland, Ohio. The "VIBRA-BALL" vibrator is sold with mounting flanges that are integral with the raceway housing. By machining off the flanges and machining a circular outer surface onto the housing, the thus-modified vibrator can be press fitted into a roll.

To actuate the vibrator assembly, pneumatic fluid is injected into the raceway through port 124b, driving the ball 134 in a circular path about the raceway 124a. As the relatively massive ball 134 traverses the raceway, it sets up a circular vibratory motion in the vibrator assembly and thus in each of the rolls. The circular vibrating motion causes the rolls and the fins 120 on the rolls to work the impregnated fabric being applied against the mold surface or against a previously applied layer of fabric. As the vibrating rolls work the fabric, the entrapped air is driven from beneath the newly applied layer of impregnated fabric, through the resin in the fabric, and out to the exposed surface of the fabric. The air bubbles then pass between the roll fins and into the atmosphere, thus eliminating any air bubbles that might otherwise reside below the surface of an applied fabric layer. Additionally, the fabric is consolidated onto the mold surface, eliminating the need for additional manual working of the fabric.

After reading the foregoing specification, one of ordinary skill in the art will readily recognize that many changes, substitutions of equivalents and other alterations can be made to the preferred embodiment of the present invention. It is therefore intended that the scope of protection granted by Letters Patent hereon be limited only by the definition contained in the appended claims and equivalents thereof.

The embodiments of the invention in which an exclusive property or privilege is claimed are defined as follows:

1. An apparatus for applying a liquid saturated fabric to a surface comprising:
   a frame including means for holding and dispensing a roll of fabric, impregnating means for saturating said fabric with a liquid, and means for dispensing said fabric from said roll of fabric to said impregnating means,
   a subframe, and a first set of generally axially aligned applicator rolls, and first mounting means for mounting said applicator rolls for rotational movement on said subframe, said applicator rolls being serially coupled to each other and to said subframe by flexible axles generally coaxially aligned with said applicator rolls, said flexible axles allowing said applicator rolls to move transversely relative to the axes of said applicator rolls,
   second mounting means for mounting said subframe on said frame for swinging movement about an axis generally parallel to the axes of said applicator rolls, said applicator rolls being adapted to receive said fabric from said impregnating means and being adapted to apply said fabric to said surface as said frame moves relative to said surface, and
   means affixed directly to each of said applicator rolls for vibrating said applicator rolls in a direction transverse to the axes of said applicator rolls.

2. The apparatus of claim 1 further comprising:
   means for mounting said frame for selective movement in three dimensions and for selectively rotating said frame about a substantially vertical axis.

3. The apparatus of claim 1 further comprising
   a first set of parallel floor-mounted tracks,
   a gantry frame and means mounting said gantry frame for travel along said first set of tracks, said gantry frame including a second set of parallel overhead tracks oriented substantially orthogonally to said first set of tracks,
   a carriage and means mounting said carriage for travel along said second set of tracks, and
   means mounting said frame on said carriage for vertical travel relative to said carriage.

4. The apparatus of claim 1 wherein said subframe comprises a pair of spaced arms each of said arms having first and second ends, said second mounting means mounting said first ends of said arms for swinging movement on said frame, said applicator rolls being mounted between the second ends of said arms.

5. The apparatus of claim 4 wherein said subframe comprises a flexible mounting bar oriented substantially parallel to the axes of and spaced from said applicator rolls, means mounting said flexible axles to said flexible mounting bar, said flexible mounting bar being pivotally coupled at a first location thereon to the second end of one of said spaced arms and being pivotally coupled at a second location thereon spaced from said first location to the second end of the other of said spaced arms, the pivot axes defined by the pivotal couplings being substantially parallel.

6. The apparatus of claim 5 further comprising means coupled to said subframe for flexing said flexible mounting bar between a relatively straight position and an arcuate position wherein said applicator rolls are oriented along a generally arcuate path.

7. The apparatus of claim 6 further comprising a second set of axially aligned applicator rolls and means for mounting said second set of applicator rolls for rotational movement on said subframe, said second set of applicator rolls positioned adjacent and spaced from said first set of applicator rolls to contact said surface simultaneously with said first set of applicator rolls, said second set of applicator rolls being serially coupled to each other and to said subframe by flexible axles coaxially aligned with said applicator rolls, that allow said second set of applicator rolls to move transversely relative to the axes of said second set of applicator rolls, said apparatus further comprising a second flexible mounting bar oriented substantially parallel to the axes of and spaced from said second set of applicator rolls, means affixed directly to each of the applicator rolls of said second set of applicator rolls for vibrating said applicator rolls of said second set in a direction transverse to the axes of said applicator rolls, means mounting the flexible axles coupling said second set of applicator rolls to said second flexible mounting bar, said second flexible mounting bar being pivotally coupled at a first location thereon adjacent the second end of one of said spaced arms and being pivotally coupled at a second location thereon spaced from the first location on said second flexible mounting bar adjacent the second end of the other of said spaced arms, the pivot axes defined by the pivotal couplings on said second flexible mounting bar being substantially parallel, and means coupled to said subframe for flexing said second flexible mounting bar between a relatively straight position and an arcuate position wherein said second set of applicator rolls are oriented along a generally arcuate path.

8. An apparatus for applying a liquid saturated fabric to a surface comprising:

a subframe and a first set of generally axially aligned applicator rolls, and means for mounting said applicator rolls for rotational movement on said subframe, said applicator rolls being serially coupled to each other and to said subframe by flexible axles coaxially aligned with said applicator rolls, said flexible axles allowing said applicator rolls to move transversely relative to the axes of said applicator rolls, and means affixed directly to each of said applicator rolls for vibrating said applicator rolls in a direction transverse to the axes of said applicator rolls.

9. The apparatus of claim 8 wherein said subframe comprises a pair of spaced arms wherein each of said arms has first and second ends, said applicator rolls being mounted between the second ends of said arms.

10. The apparatus of claim 9 wherein said subframe further comprises a flexible mounting bar oriented substantially parallel to the axes of and spaced from said applicator rolls, and means mounting said flexible axles on said flexible mounting bar, said flexible mounting bar being pivotally coupled at a first location thereon to the second end of one of said spaced arms and being pivotally coupled at a second location spaced from said first location to the second end of the other of said spaced arms, the pivot axes defined by the pivotal couplings being substantially parallel.

11. The apparatus of claim 10 further comprising means coupled to said subframe for flexing said flexible mounting bar between a relatively straight position and an arcuate position wherein said applicator rolls are oriented along a generally arcuate path.

12. The apparatus of claim 9 further comprising a second set of axially aligned applicator rolls, and means for mounting said second set of applicator rolls on said subframe, said second set of applicator rolls being positioned adjacent and spaced from said first set of applicator rolls so as to contact said surface simultaneously with said first set of applicator rolls, said second set of applicator rolls being serially coupled to each other and to said subframe by flexible axles coaxially aligned with said applicator rolls that allow said second set of applicator rolls to move transversely relative to the axes of said second set of applicator rolls, said apparatus further comprising a second flexible mounting bar oriented substantially parallel to the axes of and spaced from said second set of applicator rolls, means affixed directly to each of the applicator rolls of said second set of applicator rolls for vibrating said applicator rolls of said second set in a direction transverse to the axes of said applicator rolls, means mounting the flexible axle coupling said second set of applicator rolls to said second flexible mounting bar, said second flexible mounting bar being pivotally coupled at a first location thereon adjacent the second end of one of said spaced arms and being pivotally coupled at a second location thereon spaced from the first location on said second flexible mounting bar adjacent the second end of the other of said spaced arms, the pivot axes defined by the pivotal couplings on said second flexible mounting bar being substantially parallel, and means coupled to said subframe for flexing said second flexible mounting bar between a relatively straight position and an arcuate position wherein said second set of applicator rolls are oriented along a generally arcuate path.

* * * * *